(12) United States Patent
Li et al.

(10) Patent No.: US 7,814,483 B2
(45) Date of Patent: Oct. 12, 2010

(54) CACHE SERVER AT HOTSPOTS FOR DOWNLOADING SERVICES

(75) Inventors: Jun Li, Plainsboro, NJ (US); Junbiao Zhang, Bridgewater, NJ (US); Snigdha Verma, Somerset, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 887 days.

(21) Appl. No.: 10/578,020

(22) PCT Filed: Nov. 4, 2003

(86) PCT No.: PCT/US03/35034
§ 371 (c)(1),
(2), (4) Date: May 4, 2006

(87) PCT Pub. No.: WO2005/048011
PCT Pub. Date: May 26, 2005

(65) Prior Publication Data
US 2007/0089110 A1   Apr. 19, 2007

(51) Int. Cl.
G06F 9/445 (2006.01)
G06F 15/16 (2006.01)

(52) U.S. Cl. .............. 717/177; 717/175; 717/176; 709/231; 709/239

(58) Field of Classification Search ............. 709/217; 717/174
See application file for complete search history.

(56) References Cited

U.S. PATENT DOCUMENTS

| | | | |
|---|---|---|---|
| 5,991,306 A | | 11/1999 | Burns et al. |
| 6,169,897 B1 | * | 1/2001 | Kariya .............. 455/456.3 |
| 6,349,326 B1 | * | 2/2002 | Lam ................... 709/203 |
| 6,456,234 B1 | * | 9/2002 | Johnson ............ 342/357.09 |

(Continued)

FOREIGN PATENT DOCUMENTS

JP    9-325928    12/1997

(Continued)

OTHER PUBLICATIONS

Office Action for U.S. Appl. No. 10/591,556 mailed Dec. 18, 2009.

(Continued)

*Primary Examiner*—Tuan Q Dam
*Assistant Examiner*—Isaac T Tecklu
(74) *Attorney, Agent, or Firm*—Robert D. Shedd; Robert B. Levy

(57) ABSTRACT

Remote site downloading of content to a hotspot occurs by way of a cache server, which, when networked the hotspot, processes download, order proxies received from remote content provider servers or content user mobile devices. The cache server stores content files downloaded over the Internet from the content provider servers according to the proxies, and delivers content files to the appropriate mobile devices when they sign in at the hotspot. For example, a set top box at a hotspot can receive an instant message which includes a data set, including cookies, from a personal data assistant. There after, the set top box can download a movie from a movie vendor web site which has been previously ordered and paid for by a user using the personal data assistant over a cellular network, and then wirelessly transmit the movie to the personal data assistant using Wi-Fi protocol when it arrives at the hotspot and is authenticated.

34 Claims, 2 Drawing Sheets

U.S. PATENT DOCUMENTS

| | | | |
|---|---|---|---|
| 6,714,797 B1 * | 3/2004 | Rautila | 455/552.1 |
| 6,760,757 B1 | 7/2004 | Lundberg et al. | |
| 6,772,139 B1 | 8/2004 | Smith, III | |
| 7,457,851 B2 * | 11/2008 | Ramaswamy et al. | 709/219 |
| 2002/0062342 A1 * | 5/2002 | Sidles | 709/203 |
| 2002/0062361 A1 * | 5/2002 | Kivipuro et al. | 709/219 |
| 2002/0083148 A1 * | 6/2002 | Shaw et al. | 709/214 |
| 2002/0085719 A1 * | 7/2002 | Crosbie | 380/248 |
| 2002/0191572 A1 * | 12/2002 | Weinstein et al. | 370/338 |
| 2004/0143652 A1 * | 7/2004 | Grannan et al. | 709/223 |
| 2005/0010648 A1 * | 1/2005 | Ramaswamy et al. | 709/217 |
| 2005/0018695 A1 | 1/2005 | Ramaswamy et al. | |
| 2005/0038874 A1 | 2/2005 | Ramaswamy et al. | |
| 2005/0044260 A1 * | 2/2005 | Abramson et al. | 709/233 |
| 2005/0128995 A1 * | 6/2005 | Ott et al. | 370/349 |
| 2005/0172080 A1 * | 8/2005 | Miyauchi | 711/136 |
| 2005/0181776 A1 * | 8/2005 | Verma et al. | 455/418 |
| 2005/0273514 A1 * | 12/2005 | Milkey et al. | 709/232 |
| 2006/0158341 A1 * | 7/2006 | Chipchase et al. | 340/825.22 |
| 2007/0198674 A1 | 8/2007 | Li et al. | |
| 2008/0153413 A1 | 6/2008 | Li et al. | |
| 2008/0235360 A1 | 9/2008 | Li et al. | |
| 2009/0070423 A1 * | 3/2009 | Ramaswamy et al. | 709/204 |

FOREIGN PATENT DOCUMENTS

| | | |
|---|---|---|
| JP | 11-175539 | 2/1999 |
| JP | 2005-513617 | 5/2005 |
| WO | WO 03/052609 | 6/2003 |
| WO | WO 03/052610 | 6/2003 |

OTHER PUBLICATIONS

Office Action for U.S. Appl. No. 10/591,556 mailed Jun. 19, 2009.
Office Action for U.S. Appl. No. 10/591,556 mailed Feb. 4, 2009.
Office Action for U.S. Appl. No. 10/591,556 mailed Oct. 3, 2008.
Office Action for U.S. Appl. No. 10/592,629 mailed Feb. 18, 2010.
Office Action for U.S. Appl. No. 10/592,629 mailed Jul. 24, 2009.
Office Action for U.S. Appl. No. 10/592,629 mailed Jan. 29, 2009.

* cited by examiner

CACHE SERVER AT HOTSPOTS FOR DOWNLOADING SERVICES

This application claims the benefit, under 35 U.S.C. §365 of International Application PCT/US2003/035034, filed Nov. 4, 2003, which was published in accordance with PCT Article 21(2) on May 26, 2005 in English.

This invention relates to the field of data communications, more particularly to remote site downloading systems and methods.

BACKGROUND ART

Users of multimedia-capable mobile devices such as personal data assistants (PDAs) and cellular telephone-PDA hybrids can use cellular mobile networks to send and receive e-mail and obtain web services. However, using such cellular networks is not efficient for downloading or streaming large content files such as movies, music, television programs, or other multimedia files. The cost per delivered multimedia bit and speed make it more cost-efficient for the mobile device user to use a cable broadband, DSL, or telephone modem for downloading or streaming such large multimedia content files.

The large content files are stored in content provider web servers which can be adopted for web commerce so that a user may have to pay for access or downloading of each content file, or may have to have a paid subscription for access to a limited or unlimited number of content files from that content provider. Such web commerce-adapted content provider web servers require authentication of the user subscription or payment prior to allowing a stored content file to be downloaded or streamed.

If the mobile device user is traveling, for example, and only has web access to a less cost-efficient network such as a cellular network but plans to be at a second location with a higher speed connection and/or more cost-efficient downloading capability at some future time, the mobile device user may wish to defer selecting, ordering and paying for such large content files until the arriving at the second location.

The second location having the more cost-efficient capacity may be a public access point, known as a "hotspot" where Wireless Local Area Network (WLAN) a wireless broadband computer network in a public space has been established. Hotspots currently offer connection speeds of 11 megabits per second using IEEE 802.11b ("Wi-Fi") standard or 55 megabits per second using IEEE 802.11g, and may be located in coffee shops, restaurants, hotels, airports, bookstores, copy shops, and convention centers, for example. At hotspots, a user with a Wi Fi-enabled mobile device such as a PDA, laptop computer, cellular telephone, or hybrid PDA-Cell phone, for example, can access the Internet and download or stream large content files very cost-efficiently.

Internet access at hotspots is generally provided either by a subscription service, or a payment for each use, or is free, and is enabled by a wireless router which provides a radio transceiver which communicates with a laptop or PDA or cell phone having a wireless card. A mobile user which is not Wi-Fi enabled may connect to the hotspot Internet server in some cases with a wire connection, although in the future all mobile devices are expected to be Wi-Fi enabled.

It is conventional for a wireless mobile device user to access the Internet at a hotspot and select, request, and pay for, a content file from a remote content provider server for immediate downloading.

However, the mobile user may find it convenient to select a content file on a content provider web site while traveling and/or on a cellular or other lower speed network and have the content file downloaded in advance for immediate access when the mobile user visits the hotspot without having to connect to the content provider web site during the visit to obtain the content file.

DISCLOSURE OF THE INVENTION

The present invention makes it possible and very convenient for the mobile device user to select and order a content file from a content provider while at a first location and have it automatically downloaded at a hotspot and cached so that it is available at the hotspot for cost-efficient local downloading or streaming when visiting the hotspot.

When the mobile user completes a download order from a content provider over the first network and identifies the hotspot where the mobile user wishes to access the content file, for example by downloading or streaming, a proxy is created which is forwarded to a hotspot address, where a cache server computer acts on the proxy by downloading the content file from the content provider over the Internet. The cache server processes the proxy and downloads the content file either immediately upon receipt of the proxy or at any more optimal time depending on other tasks and capacity, preferably prior to the arrival of the mobile user. The proxy may optionally contain data regarding the mobile user's identity, expected time of arrival, the identity of the content file, the content provider address, and/or a unique order identification, in which case the cache server need only provide the order identification at the content provider to initiate the download. The proxy may be a data set or an executable object, and it may comprise one or more cookies.

When the mobile user arrives at the hotspot, the mobile device is preferably synchronized to the cache server. For example, the mobile user may have to sign in with user name and password which is authenticated by the cache server or other computer at the hotspot, or the mobile device itself may have a unique identification broadcast by a Wi-Fi component of the mobile device which can be received in the Wi-Fi local area network and authenticated, and if the identification matches a content file order and a content file is cached, the cache server at the hotspot may immediately transfer the file to the mobile device. The mobile user may find it very convenient to have the mobile device immediately recognized when it arrives at the hotspot and the previously ordered content file(s) downloaded automatically without requiring user input. The caches server can perform the authentication and authorization function as well as accounting function wherein a user account may be charged for the hotspot service.

The system of the invention comprises the cache server. The cache server is typically provided at a hotspot and is programmed to receive the aforementioned proxies and act on them to download content files for a plurality of mobile users and cache them in local storage and deliver the correct content files from local storage to the correct individual mobile users when each such mobile user has arrived and synchronized at the hotspot.

The cache server can be any computer but is preferably one known as a set-top box adapted to be networked and to cache files for many users. A digital video recorder is a form of set-top box, which can act as a cache server according to the invention. Depending on the capacity of the cache server, many content files may be stored and delivered to a large number of mobile devices. It is even possible to have more than one-mobile device downloading or streaming from the cache server at the hotspot at the same time. In a preferred embodiment, the cache server can receive multiple proxies to download the same content file and is programmed to cache only one copy so that rather than delete the content file after the first of the mobile users which have ordered it has received it locally, the cache server can store the content file until all of the mobile users which have ordered the same file have received it locally. Depending on permission of the content providers, the cache server may store the most popular files in anticipation of additional orders from mobile users.

The proxies can be created either by the mobile devices which are specially programmed to create them based on content files selected from particular content provider web sites, or they can be created by specially programmed content provider web servers. There are other possible ways for the proxy to be created, but in each case the proxy is sent to a hotspot address where the cache server is available. The cache server is preferably networked in the hotspot local area network.

The proxies can be sent to the hotspot address by e-mail or instant messaging, for example, although other mechanisms are also possible. The proxy can be an attachment to the e-mail or instant message which has data identifying the mobile user's order from the content provider, or it can include an executable object which causes the cache server to automatically download.

The e-mail or instant messages can contain encrypted, authenticated content download requests of a mobile user at a first location, which can be executed by the cache server to automatically download the requested content file at a time which is convenient to the hotspot LAN, and store the downloaded content until the mobile user signs on to the hotspot LAN.

The cache server computer preferably creates a directory for each mobile user, and in each such directory stores either the downloaded content file or a link to a different storage partition where the content file requested by the mobile device is cached. Instead of such directories, a database of mobile users can be used. The server computer of the invention can be a shared set-top box, for example, which may be any digital storage device, for example a device similar to a personal video recorder, which serves a plurality of mobile users which have requested content files on a first network, for example a cellular network, downloads the requested files over a second network, for example over a broadband connection to the Internet, and then stores the files until the mobile device arrives within Wi-Fi range, or wired range, of the cache server computer and synchronizes to the cache server computer. After the synchronization between the mobile device and the server computer, the content file is transferred to the mobile device, either by downloading to the mobile device or by streaming to the mobile device. In the case of streaming of a movie content file, for example, the mobile user can view the movie while synchronized to the cache server. If the mobile device has sufficient storage capacity, the cache server can download the movie content file to the mobile device for future viewing.

Cache servers useful in the present invention preferably have one or more processors, programming, means to access the Internet with a web browser, and storage which can be used to cache downloaded content files from a remote site at a first time for delivery at a second time to a mobile device. Such cache servers can connect with an Internet service provider via cable modem, DSL, satellite, other data connection, or public switched network via a telephone modem. A preferred cache server is a modified set-top box such as a digital video recorder which is programmed according to the invention to serve content files to multiple mobile users, each of which have requested files to be downloaded and stored in the cache server such as the modified PVR.

The shared cache server within a hotspot LAN serves a dynamic set of content users to (1) download mobile user-requested content from the cache server, (2) store the downloaded content in a dynamically created directory cache for the mobile content user, and (3) synchronize the downloaded content to the mobile device of the requesting user when the mobile device is connected to the hotspot network.

The invention also comprises a method to receive a download content order at a hotspot from a mobile device at a different location, automatically execute the download order, cache the downloaded content file, and deliver the cached content file to the mobile device when it synchronizes at the hotspot. The download content order is preferably in the form of a proxy containing data identifying the order so that the cache server can act on it and find the content file over the Internet and download it, and more preferably containing an executable object which causes the cache server to automatically connect with the content provider web server and authenticate or synchronize so as to cause immediate downloading of the appropriate content file to the cache server.

The mobile device user would select a content file stored on a remote server during a time and/or while on a network and/or at a location which is inconvenient for downloading the content file to the mobile device. For example, when using a PDA over a cellular network, the downloading speed is significantly lower and the online time is much more costly than when the PDA is on a Wi-Fi network at a hotspot. If the selected content file is relatively large, such as a movie, it is much more efficient to download the movie at the hotspot. Rather than waiting until the mobile user is signed in at the hotspot to select the content file, the present invention makes it possible for the PDA user to order the movie prior to arriving at the hotspot and to view it or download it after arriving at the hotspot.

Often the content file on the remote server will require purchase or authorization and so the present invention in one aspect allows the mobile user to purchase the content file from a web site which sells licenses to use such content files, and to send a proxy to the hotspot containing a cookie having all of the code necessary for the hotspot computer to download the file previously purchased by the mobile user.

BRIEF DESCRIPTION OF THE DRAWINGS

The invention is illustrated in the figures of the accompanying drawings which are meant to be exemplary and not limiting, in which like references are intended to refer to like or corresponding parts, and in which.

MODES OF CARRYING OUT THE INVENTION

Figure 1:
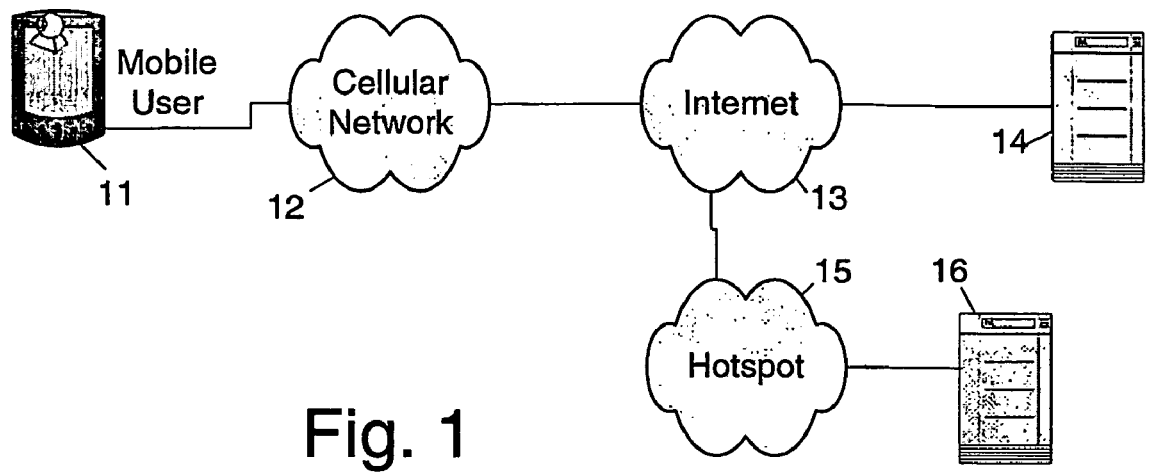
FIG. 1 illustrates an overall system of the invention when the mobile device is ordering a content file.

Referring first to FIG. 1, an embodiment of the invention is illustrated wherein a personal data assistant (PDA) 11 can use a cellular network 12 to access the Internet 13 and open a web page dynamically generated by a content provider's web server 14, Movies-Inc.com in this example, where the PDA user may select and complete an order for a content file, the movie entitled Matrix Reloaded in this example.

Such low speed, low bandwidth cellular networks 12 are usually suitable for low demand functions such as sending and receiving e-mail, but are not suitable for downloading large files such as large attachments to e-mails, movies, music, video, and the like. The personal data assistant 11 is capable of browsing the Internet 13 and accessing a Web site 14 where movie files having video and audio components can be requested.

Many hotspots would have cache servers of the invention and the user would normally select a certain hotspot and expected time of arrival, or travel schedule date in the PDA and a hotspot locations database in the PDA would enable or assist in the selection of a particular hotspot. A hotspot 15, e.g., the Nassau Street, Princeton, N.J. Starbucks is selected in this example, such hotspot having a cache server 16 which is a specially programmed digital video recorder set-top box, in the hotspot network.

Figure 2:
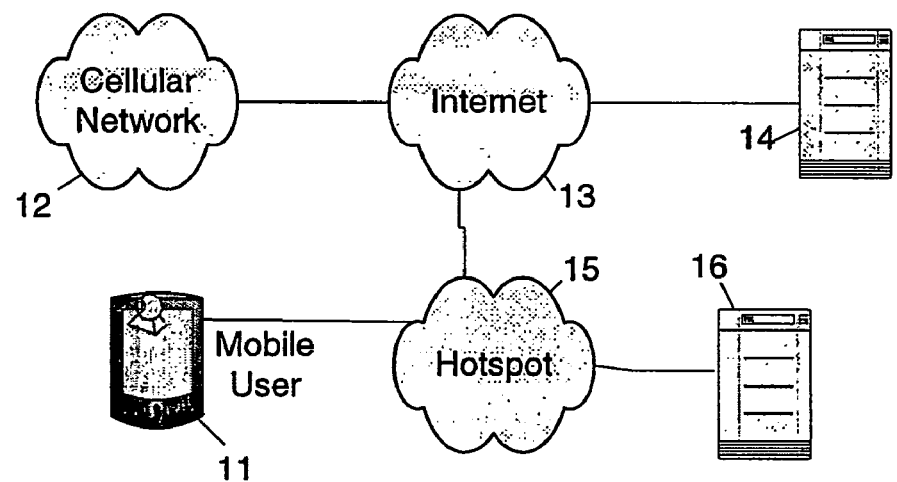
FIG. 2 illustrates an overall system of the invention when the mobile device is at a hotspot and is downloading or streaming a file from the cache server.

Referring to FIG. 2, after the user arrives at the selected Starbucks, the PDA 11 can be synchronized to the hotspot 15 wireless area network and can locally obtain the Matrix Reloaded content file locally stored in the cache server 16.

Figure 3:
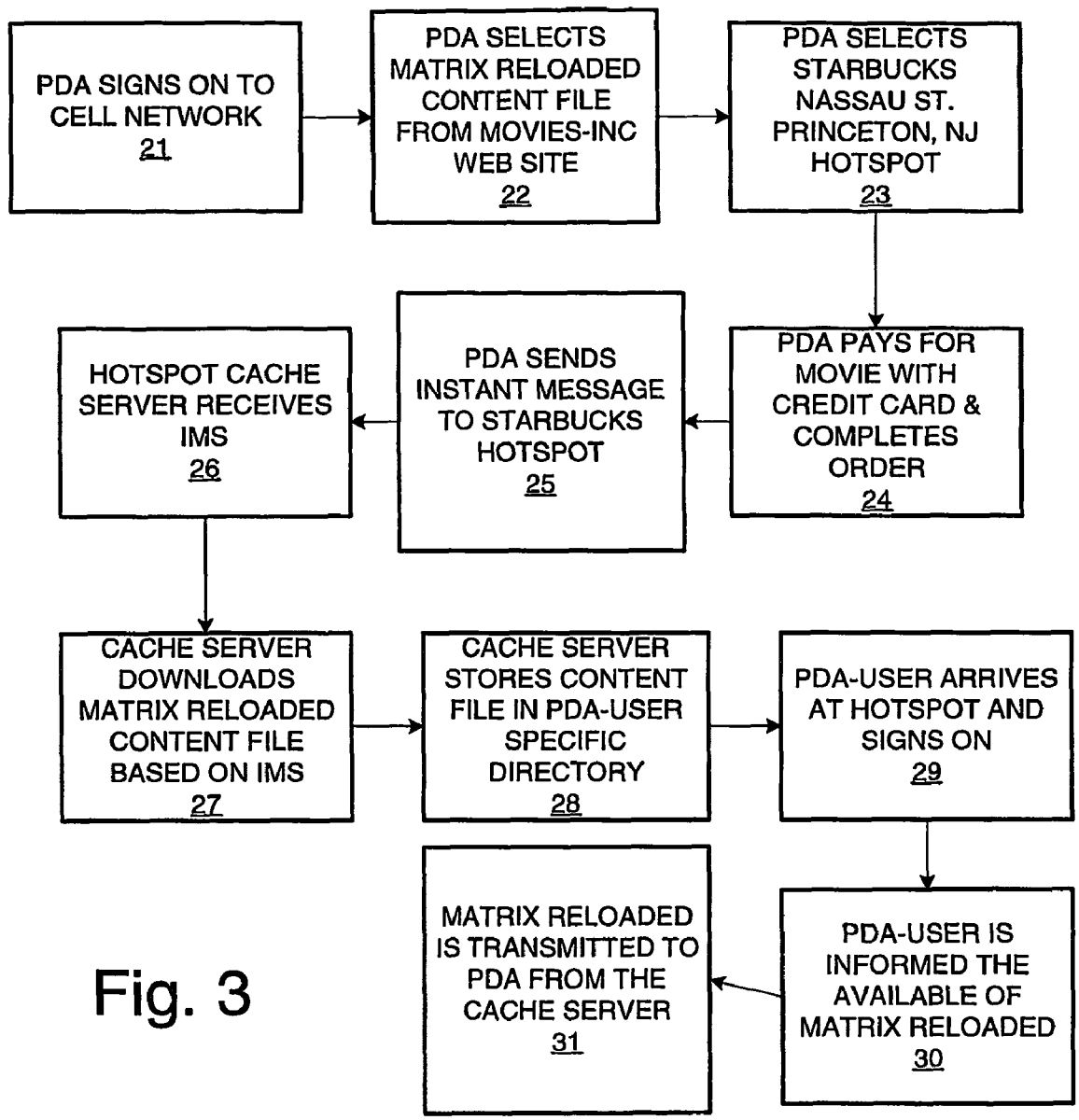
FIG. 3 is a block diagram illustrating flow chart of an embodiment of the method of the invention.

In FIG. 3, an example of a series of steps in an embodiment of the invention is illustrated wherein the PDA 11 is signed in during step 21 to a cellular network and opens the Movies-Inc.com web page, selects during step 22 the movie entitled Matrix Reloaded, selects Starbucks Nassau Street, Princeton, N.J. during step 23 as the hotspot where the PDA user expects to be at 9 p.m. that evening, and completes the order by supplying credit card information during step 24. In other embodiments the user may have a subscription to Movies-Inc.com and so only user id and password may be required, and in other embodiments the user may order public domain content files from the content provider web site.

The PDA, or in another embodiment Movies-Inc.com web server, sends an instant message to the e-mail address of the selected hotspot during step 25. In other embodiments the hotspot may be in a subscription network, which may include the content provider, in which case all of the user's subscription and authentication information can be in the content server database.

The instant message, or an e-mail in another embodiment, includes a cookie proxy which is received during step 26 by the cache server at the hotspot, which then downloads the content file, Matrix Reloaded during step 27, and stores the movie content file in a common storage directory G:\cache\ and stores a symbolic link in a user specific storage directory, G:\username\ during step 28. The proxy may also include encrypted data (by content user's public key) containing a license to play the content on the mobile device.

The cache server may check prior to downloading to see if the requested content file already stored locally in the storage of the cache server 14 and if the cache has enough space, download the content file to the storage cache; otherwise the cache server may defer downloading until it has enough space as long as it is prior to the arrival of the user which requested the content file.

When the user of the PDA 11 of FIGS. 1 and 2 arrives during step 29 of FIG. 3 at the Starbucks, the hotspot recognizes the PDA as being subscribed to the Starbucks hotspot network. After sign on, the user of the PDA is acknowledged that Matrix Reloaded is in the cache server for him/her during step 30 and either upon request or automatically, is downloaded or streamed to the PDA during step 31.

The cache server 16 of FIGS. 1 and 2 preferably is programmed to create a directory if a new user has requested a download, and to link the corresponding directory for each user to the content in the cache. The cache server 16 can save a license file in the same user specific directory. In this way cached files can be managed and the files which do not correspond to a pending request, i.e., are waiting for pickup at the hotspot by the requesting user, are replaced by other downloading content if there is no link to the content. The cache server 16 also can function to synchronize to mobile devices when they arrive at the hotspot.

A mobile device can authenticate itself with the cache server (a shared set-top box) with a pre-established trust relationship (e.g. through a user id and a shared secret). The mobile device of a content user is synchronized to its corresponding directory on the shared cache server 16 when the mobile device 11 is connected, meaning the content file pointed by the link in the directory is transferred during step 27 of FIG. 3 to the mobile device 11 of FIGS. 1 and 2. After the synchronization, the symbolic links and the license file are removed.

In an embodiment of the invention, the proxy comprises data that enables the cache server 16 to act on behalf of the PDA user 11 to download content files from a content server 14 during step 27 of FIG. 3. This proxy data may include, for example, (a) identity information of the content to be downloaded, (a) user information required to access the content, and (c) information regarding how the download is to be performed. Content identity information may include, for example, the filename and network address of the content to be downloaded including the network address of the content server on which the content resides. The user information required to access the content may include any information necessary to gain access to the content to be downloaded as well as the content server on which the content resides, including, for example, user ID and password information. When a content file viewing or downloading license is required, the user information may also include payment related information such as, for example, authentication and account information. Information regarding how the download is to be performed may include, for example, a time at which the download is to occur or a location to which the content is to be downloaded, e.g., the network address the cache server 16.

In another embodiment of the invention, the proxy comprises data and computer code. The data, as described above, enables the cache server 16 to act on behalf of a user 11 to download content from a content server (e.g., includes content identity information, user information, and information regarding the download) during step 27. The computer code provides the functionality of requesting the downloading of content from a content server. Thus, a cache server 16 executing the computer code contained in the proxy acts to request the downloading of content based on the data contained in the proxy. Generally the content server 14 is an HTTP server and the proxy may contain computer code enabling a computer system to function as an HTTP client.

Although the data contained in a proxy may be predefined and static, content provider 14 web server system may contain components enabling this data to be dynamically provided. For instance, content provider 14 may include a user interface that allows a user to provide any of the aforementioned types of data and storage for storing the provided data and from which the provided data can be later retrieved.

For example, a user may use the user interface to provide a desired date and time at which the requested download is to occur. In another example, a user may use the user interface to input download destination locations (e.g., network addresses of hotspots to which content may be downloaded and from which downloaded content may be retrieved) which may be used immediately to generate a proxy or may be stored in the storage and retrieved later through the user interface to generate a proxy. In this manner, information may be stored and later retrieved regarding locations a user frequently downloads to, e.g., hotspots 15 associated with the user's home or office. Also, information may be stored and later retrieved regarding locations a user expects to travel to, e.g., hotspots 15 associated with airports the user expects to travel through or hotels at which the user expects to stay.

In a preferred embodiment of the invention, PDA 11 contains a content server communication module which enables it to communicate with a content server 14 in order to of content identity information. In this embodiment, a user operates the PDA 11 to communicate with a content server 14 to determine what content is available for download from the content server 14. The user 11 selects the content to be downloaded and the selection is sent to a module which extracts the content identity information from the selection. For example, where the content server 14 to be accessed is a web server, PDA 11 may comprise a standard web browser that is modified by known methods, e.g., a plug-in, so that download requests normally sent to the web server are redirected to the module. A user 11 operates the web browser to interact with the content provider web server 14 and identifies content available for download. When the user selects the content to download (e.g., by selecting a link to the desired content presented by the web server) during step 22 of FIG. 3, the download request created by the web browser that is normally sent to the web server is instead redirected to a module which extracts content identity information (e.g., the filename of the content and the IP address of the web server) from the request and is included in a data set to be sent to the cache server during step 25 of the FIG. 3.

It should be noted that the cache server 16 may receive a plurality of proxies from a plurality of content providers 14. Each received proxy may be stored and organized in cache server storage as in a queue, so that each stored proxy may be used to perform the download represented by the proxy's parameters at the time indicated by the proxy's parameters.

In another example, after a download has occurred, cache server 14 may send a communication, e.g., an e-mail, to the user 11 which requested the download, e.g., using the user's 11 e-mail address contained in the user information of the object corresponding to the download. The e-mail may contain a link to the downloaded file stored at cache server 14 so that the user may, by opening the e-mail and selecting the link, cause the file stored at the hotspot cache server 14 to be automatically transferred to the PDA 11 operated by the user.

In another embodiment of the invention, a computer program product containing a computer usable medium having computer readable code embodied therein, the computer readable code, when executed, causing a computer to implement a method for facilitating the transferring of a content file from a remote content provider to a cache server at an access point and later to a local content user client device containing: providing a proxy that facilitates the downloading of a content fife to a cache server from a remote content provider over the Internet using Internet protocol; and transmitting the proxy to a cache server capable of using the proxy to download the content file from the remote content provider over the Internet and later transfer the downloaded content file to the client device. The implemented method may further comprise obtaining parameters including at least the identity of the content file, the identity of the content provider, the identity of the cache server, and identity of the content user; and in the implemented method, the providing a proxy may comprise providing a proxy using the obtained parameters. Moreover, in the implemented method, the obtaining parameters may comprise capturing a content user request to the content provider for permission for the cache server to download the identified content file; and extracting at least some of the parameters from the captured request. Furthermore, in the implemented method, the providing a proxy may comprise providing a proxy including computer code which, when executed, causes the content file to be downloaded from the content provider.

While the invention has been described and illustrated in connection with preferred embodiments, many variations and modifications as will be evident to those skilled in this art may be made without departing from the spirit and scope of the invention, and the invention is thus not to be considered as limited to the precise details of methodology or construction set forth above as such variations and modification are intended to be included within the scope of the invention.

The invention claimed is:

1. A system for obtaining at least one content file requested by a content user from at least one content provider for remote site downloading at an access point and delivering the at least one content file after arrival of the content user at the access point, the system comprising:
   a cache server having:
   means for connecting to a data network,
   means for downloading the at least one content file from the at least one content providers over the data network upon receipt of a proxy,
   means for storing the at least one downloaded content file,
   for locally delivering at the access point the at least one stored content file to the content user which requested the content file,
   a processor for dynamically creating a directory for a content user when a content file requested by the content user is downloaded from the content provider, and
   a memory for storing the downloaded content file in the directory corresponding to the content user.

2. The system of claim 1 wherein the means to locally deliver the content file comprises a wireless router at the access point.

3. The system of claim 1 wherein the cache server further comprises:
   means to synchronize the downloaded content file to the content user when the content user is at the access point.

4. The system of claim 1 further comprising means to share stored content files for multiple content users including at least one dynamic user directory.

5. The system of claim 1 wherein the cache server is a networked set-top box.

6. The system of claim 1 wherein the proxy is a data set.

7. The system of claim 1 wherein the proxy is a data set comprising cookies.

8. The system of claim 1 wherein the proxy is a data set or executable object contained in an e-mail or an instant message received by the cache server.

9. The system of claim 1 wherein the proxy comprises data identifying the content file, content provider, content user, and/or expected time of arrival at the access point.

10. The system of claim 1 wherein the means to locally deliver comprises a wireless router or access point bridge at the access point, programming to enable the content user to log in at the access point with a mobile device and, upon authentication of a logged in content user, routing the content file to the content user's mobile device.

11. The system of claim 1 wherein the cache server is a networked, Internet-enabled digital storage device.

12. A system for facilitating the transferring of a content file from a content provider to a content user mobile device comprising:
   means for generating a proxy that identifies the content file, content provider, and content user; and
   means for transmitting the proxy to a cache server at an access point;
   a cache server at the access point includes:
   means for downloading the content file from the content provider according to the transmitted proxy;
   means for locally transmitting the content file to a content user mobile device, said means for locally transmitting the content file comprising means in the cache server for receiving and decoding a proxy containing parameters comprising an identification of the content file to be downloaded and the Internet address of the content provider;
   means for executing the proxy to download the identified content file from the content provider; and means for transferring the downloaded content file to the content user mobile device at the access point;
   a processor for dynamically creating a directory for a content user when a content file requested by the content user is downloaded from the content provider; and
   memory for storing the downloaded content file in the directory corresponding to the content user.

13. The system of claim 12 further comprising means for obtaining parameters including at least the identity of the content file, the identity of the content provider, and the identity of the access point having the cache server, wherein the means for providing the proxy comprises means for providing a proxy using the obtained parameters.

14. The system of claim 12 further comprising means for the content user to pay the content provider and/or a remote downloading service provider for permission to remotely download the content file to the cache server at the access point and/or for locally transferring the content file from the cache server to a mobile device.

15. The system of claim 13 wherein the means for obtaining parameters comprises means for capturing a request to the cache server to download the content file; and means for extracting at least some of the parameters from the captured request.

16. The system of claim 12 wherein the means for providing a proxy comprises means for providing a proxy including computer code which, when executed at the access point, causes the content file to be downloaded from the content provider.

17. A system for facilitating the transferring of a content file from a remote content provider to a cache server over the Internet and for locally transferring the content file to a content user mobile device comprising:
   means in the cache server for receiving and decoding a proxy containing parameters comprising an identification of the content file to be downloaded and the Internet address of the content provider;
   means for using the proxy to download the identified content file to the cache server; and
   means for locally transferring the downloaded content file to the content user mobile device;
   wherein the cache server comprises:
   a processor for dynamically creating a directory for a content user when a content file requested by the content user is downloaded from the content provider; and
   a memory for storing the downloaded content file in the directory corresponding to the content user.

18. The system of claim 17 further comprising means for storing the received proxy; wherein the proxy comprises data identifying a time at which the content file is to be downloaded from the content provider; and wherein the means for using the proxy comprises means for using the stored proxy to download the content file from the content provider at the time indicated in the data of the proxy.

19. The system of claim 17 wherein the means for receiving a proxy comprises means for receiving a proxy containing parameters including content user authentication data required for the content user to synchronize with the cache server and obtain access to the downloaded content file; and wherein the means for using the proxy comprises means for using the user information contained in the proxy to download the identified data from the identified at least one server.

20. A computer program product comprising a computer readable physical storage medium having computer readable code embodied therein, the computer readable code, when executed, causing a computer to implement a method for facilitating the transferring of a content file from a remote content provider to a cache server at an access point and later to a local content user client device comprising:
   providing a proxy that facilitates the downloading of a content file to a cache server from a remote content provider over the Internet using Internet protocol, the proxy containing an identification of the content file;
   transmitting the proxy to a cache server capable of using the proxy to download the content file from the remote content provider over the Internet and later locally transfer the downloaded content file to the client device;
   dynamically creating a directory for a content user when a content file requested by the content user is downloaded from the content provider; and
   storing the downloaded content file in the directory corresponding to the content user.

21. The computer program product of claim 20 wherein the implemented method further comprises obtaining parameters including at least the identity of the content file, the identity of the content provider, the identity of the cache server, and identity of the content user; and wherein, in the implemented method, providing a proxy comprises providing a proxy using the obtained parameters.

22. The computer program product of claim 20 wherein, in the implemented method, obtaining parameters comprises capturing a content user request to the content provider for permission for the cache server to download the identified content file; and extracting at least some of the parameters from the captured request.

23. The computer program product of claim 20 wherein, in the implemented method, providing a proxy comprises providing a proxy including computer code which, when executed, causes the content file to be downloaded from the content provider.

24. A method of caching at least one content file at an access point for at least one content user who has requested, prior to being present at the access point, the at least one content file to be downloaded from a content server and stored for delivery when the at least one content user is present at the access point comprising
   upon receipt at a cache server of a message containing an identification for the at least one content file ordered by the at least one content user prior to the at least one content user being present at the access point, downloading the at least one content file from the content server;
   storing the downloaded content file at the access point;

upon an at least one content user mobile device logging in at the access point, locally transmitting the at least one content file to the at least one content user mobile device;

dynamically creating a directory for a content user when a content file requested by the content user is downloaded from the content provider; and storing the downloaded content file in the directory corresponding to the content user.

25. The method of claim 24 wherein the content file is delivered to the content user mobile device when the mobile device has logged in at the access point and the content user mobile device requests the delivery.

26. The method of claim 24 wherein the mobile device is a wireless enabled personal data assistant or a web-enabled cellular telephone.

27. The method of claim 24 wherein the message comprises a proxy for an order for the content file.

28. A method for facilitating the transfer of a content file from at least one remote content provider server to a content user mobile device comprising:

receiving at an access point wireless network an authenticated download order for a content file request from the content user mobile device, downloading the content file at the access point wireless local area network, caching the content file;

dynamically creating a directory for a content user when a content file requested by the content user is downloaded from the content provider, storing the downloaded content file in the directory corresponding to the content user, and upon the content user mobile client device signing in to the access point wireless network, delivering the content file to the content user mobile device.

29. A method for ordering a content file over a first network from a remote content provider at a first time and receiving the content file at a second time over an access point network comprising:

selecting an access point;

ordering over the first network the content file from the remote content provider server at the first time for downloading at the selected access point;

sending order identification data comprising a URL of the content file and a session specific cookie to the access point; responsive to reception of the order identification data at the selected access point, downloading the content file from the content provider server;

dynamically creating a directory for a content user when a content file requested by the content user is downloaded from the content provider;

storing the downloaded content file in the directory corresponding to the content user;

synchronizing a content user mobile device at the second time to the access point; and locally transferring the cached content file to the content user mobile device.

30. The method of claim 29 wherein the session specific cookie comprises the identity of user information and payment status, the previously identified computer using the cookie to cause the data to be transferred from the at least one server to the computer.

31. A method for facilitating the transferring of a content file from a remote content provider server to a content user mobile device comprising:

providing a proxy that facilitates the downloading of the content file from the content provider server the proxy including at least an identification of the content file;

transmitting the proxy to a cache server at an access point enabled to execute the proxy to download the content file from the remote content provider server, dynamically creating a directory for a content user when a content file requested by the content user is downloaded from the content provider, storing the downloaded content file in the directory corresponding to the content user, and upon the content user mobile device being associated with the access point cache server, locally transferring the downloaded content file to the content user mobile device.

32. The method of claim 31 further comprising obtaining parameters including at least the identity of the content file, the identity of the at remote content provider server, the identity of the cache server at the access point, and identity of the content user; and wherein providing a proxy comprises creating a proxy using the obtained parameters.

33. A method for facilitating the transfer of content file from a remote content provider server to a content user mobile device comprising:

programming in the mobile device which causes the mobile device, in response to content user input, to provide parameters to a cache server, the parameters including at least the identity of the content file to be downloaded and the identity of the content provider server and the cache server, in response to receiving the parameters provided by the mobile device, using the parameters to cause the identified content file to be downloaded from the remote content provider server, and dynamically creating a directory for a content user when a content file requested by the content user is downloaded from the content provider, storing the downloaded content file in the directory corresponding to the content user, and in response to a communication received from the mobile device, locally transferring the downloaded content file to the mobile device.

34. The method of claim 33 further wherein the mobile device contains the programming.

* * * * *